United States Patent [19]
Makino et al.

[11] Patent Number: 6,044,946
[45] Date of Patent: Apr. 4, 2000

[54] TORQUE CONVERTER FOR A VEHICLE

[75] Inventors: Tetsuya Makino; Masanori Ishikawa, both of Shizuoka, Japan

[73] Assignee: Jatco Corporation, Fuji, Japan

[21] Appl. No.: 09/186,442

[22] Filed: Nov. 5, 1998

[30]  Foreign Application Priority Data

Nov. 18, 1997 [JP] Japan .................................. 9-332309

[51] Int. Cl.⁷ .............................. F16D 3/34; F16D 13/60; F16D 33/00
[52] U.S. Cl. ............................ 192/45; 192/113.5; 60/361
[58] Field of Search ............................ 60/345, 346, 339, 60/361, 362; 192/113.5, 45, 41 A; 384/123

[56]  References Cited

U.S. PATENT DOCUMENTS

| | | | |
|---|---|---|---|
| 3,138,107 | 6/1964 | Zeidler | 60/361 |
| 3,954,161 | 5/1976 | Ehret et al. | 192/45 |
| 4,866,935 | 9/1989 | Hayabuchi et al. | 60/361 |
| 5,125,487 | 6/1992 | Hodge | 192/3.34 |
| 5,400,884 | 3/1995 | Matsuoka | 192/113.5 X |
| 5,640,849 | 6/1997 | Abe et al. | 60/362 |

FOREIGN PATENT DOCUMENTS 2-48658  4/1990  Japan .

*Primary Examiner*—Charles A Marmor
*Assistant Examiner*—Roger Pang
*Attorney, Agent, or Firm*—Foley & Lardner

[57]  ABSTRACT

A torque converter including a stator rotatable about an axis and having a stator hub, and a thrust bearing mounted to the stator hub. The stator hub has a recessed portion that is recessed from one axial end face of the stator hub. The thrust bearing includes a bearing race received by the recessed portion of the stator hub. A coupling connects the bearing race with the stator hub. The coupling includes a first engaging part disposed on an outer periphery of the bearing race and a second engaging part engaged with the first engaging part and disposed on an outer periphery of the recessed portion in opposed relation to the outer periphery of the bearing race. The first and second engaging parts cooperate to prevent a relative rotation between the bearing race and the stator.

15 Claims, 5 Drawing Sheets

6,044,946

TORQUE CONVERTER FOR A VEHICLE

BACKGROUND OF THE INVENTION

Field of the Invention

The present invention relates to a torque converter for a vehicle, and more specifically to a torque converter having a pair of bearings capable of withstanding thrust exerted on a stator.

Among torque converters used in a vehicle, there are many ones which have a lockup mechanism for improving fuel consumption by reducing a loss of power transmission energy in a high speed rotation of the vehicle engine.

The torque converters with the lockup mechanism include a housing, a pump, a turbine and a stator that are disposed within the housing, a drive plate or end cover connected with an engine drive shaft, and a lockup clutch disposed between the turbine and the drive plate. The lockup clutch is connected with a driven shaft via a turbine hub of the turbine and engageable with the drive plate for establishing rigid coupling of the driven shaft with the engine drive shaft in the high speed rotation. Thus, the power transmission efficiency can be increased.

One example of such kind of the torque converters has a thrust bearing mounted to the turbine hub so as to be rotatable relative to the stator. The thrust bearing includes a bearing race received by a recessed portion that is formed in the turbine hub. The bearing race is contacted with the recessed portion. The bearing race is made of an iron-based material. A retention disk opposed to the thrust bearing is mounted to a stator hub of the stator. The bearing race of the thrust bearing rotates in the recessed portion of the turbine hub during the operation of the torque converter. Since the turbine hub is made of an aluminum-based material, the recessed portion of the turbine hub suffers from abrasion caused by the frictional contact with the bearing race upon the rotation of the bearing race. This leads to shortening the life of the torque converter.

It is an object of the present invention to provide a torque converter having an extended life by preventing abrasion caused on a portion of the torque converter that receives a bearing race of a thrust bearing.

SUMMARY OF THE INVENTION

According to one aspect of the present invention, there is provided a torque converter comprising:

- a stator rotatable about an axis, the stator including a stator hub having a recessed portion that is recessed from one axial end face thereof;
- a thrust bearing including a bearing race that is received by the recessed portion; and
- a coupling connecting the bearing race with the stator hub;
- the coupling including a first engaging part disposed on an outer periphery of the bearing race and a second engaging part that is engaged with the first engaging part and disposed on an outer periphery of the recessed portion in opposed relation to the outer periphery of the bearing race, the first and second engaging parts cooperating to prevent a relative rotation between the bearing race and the stator.

DESCRIPTION OF THE PREFERRED EMBODIMENT

Referring now to FIGS. 1 to 5, a first preferred embodiment of a torque converter according to the present invention will be explained.

Figure 1:
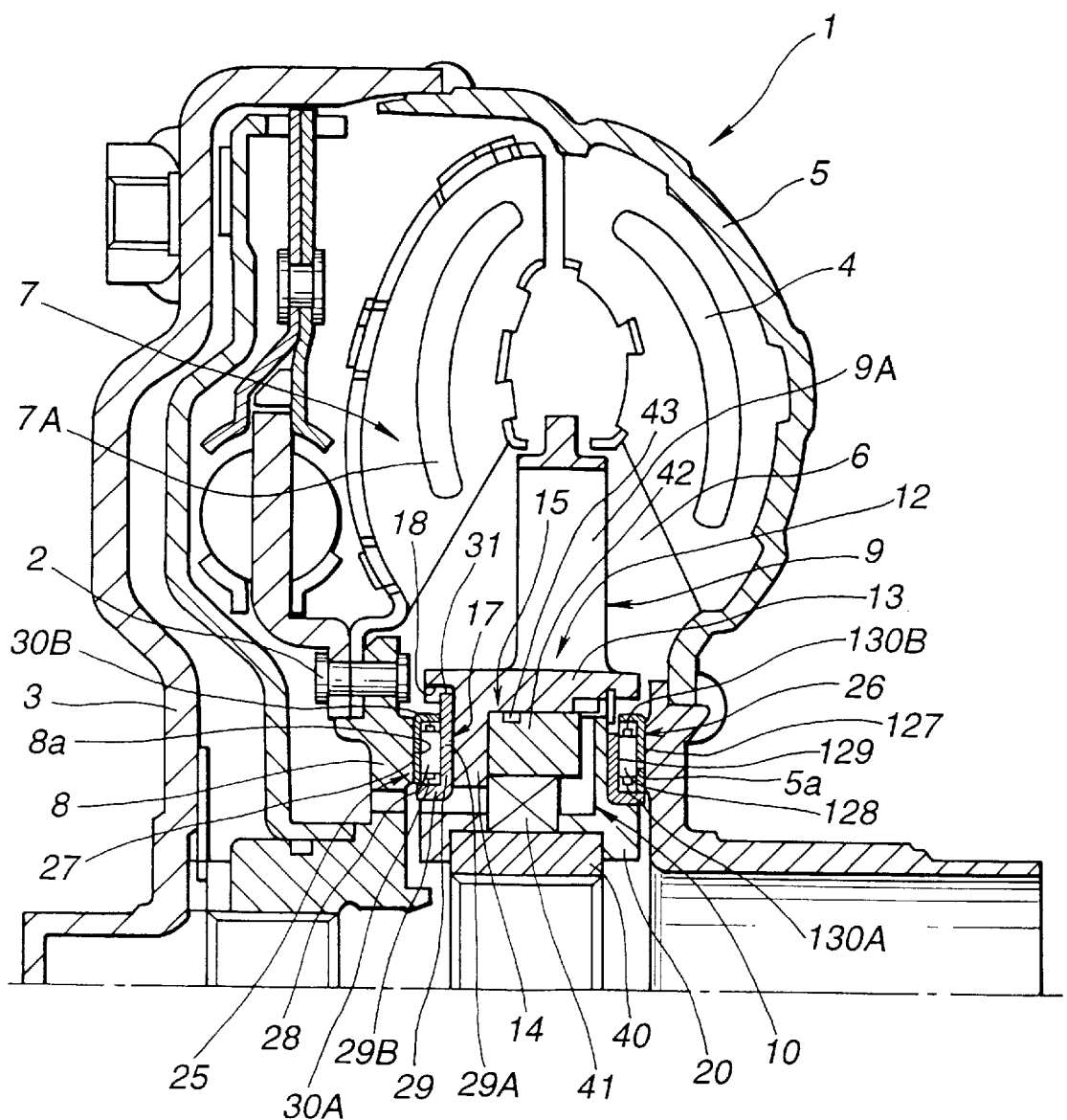
FIG. 1 is a partial axial section of a torque converter according to the present invention, showing a stator, a thrust bearing and a one-way clutch that are mounted to a stator hub of the stator.

As illustrated in FIG. 1, the torque converter 1 includes a drive plate 3 and a pump housing 5 connected with the drive plate 3. The drive plate 3 and the pump housing 5 cooperate to define an internal space 6. The internal space 6 is filled with a working fluid. The drive plate 3 is connected with an output shaft (not shown) as a drive shaft, such as an engine shaft. The pump housing 5 has a pump impeller 4 disposed within the internal space 6. A turbine 7 is arranged within the internal space 6 in opposed relation to the pump impeller 4. The turbine 7 includes turbine blades 7A and a turbine hub 8 connected with the turbine blades 7A by means of rivets 2. The turbine hub 8 is splined to an input shaft (not shown) as a driven shaft, such as an automatic transmission shaft.

A stator 9 is interposed between the pump impeller 4 and the turbine 7. The stator 9 is mounted to a stator shaft (not shown) fixed to a transmission housing. The stator 9 is adapted to rotate about an axis in one direction by a one-way clutch 10 mounted to the stator hub 12. The stator 9 is made of an aluminum-based material. The stator 9 includes stator blades 9A and a stator hub 12. The stator blades 9A extend radially from an outer circumference of the stator hub 12. A pair of thrust bearings 25 and 26 are disposed on opposed axial end portions of the stator hub 12. The thrust bearing 25 is mounted to one of the opposed axial end portions of the stator hub 12 that faces the turbine hub 8. The thrust bearing 26 is mounted to a retention plate 20 disposed on the other of the opposed axial end portions of the stator hub 12 that faces the pump housing 5.

Figure 2:
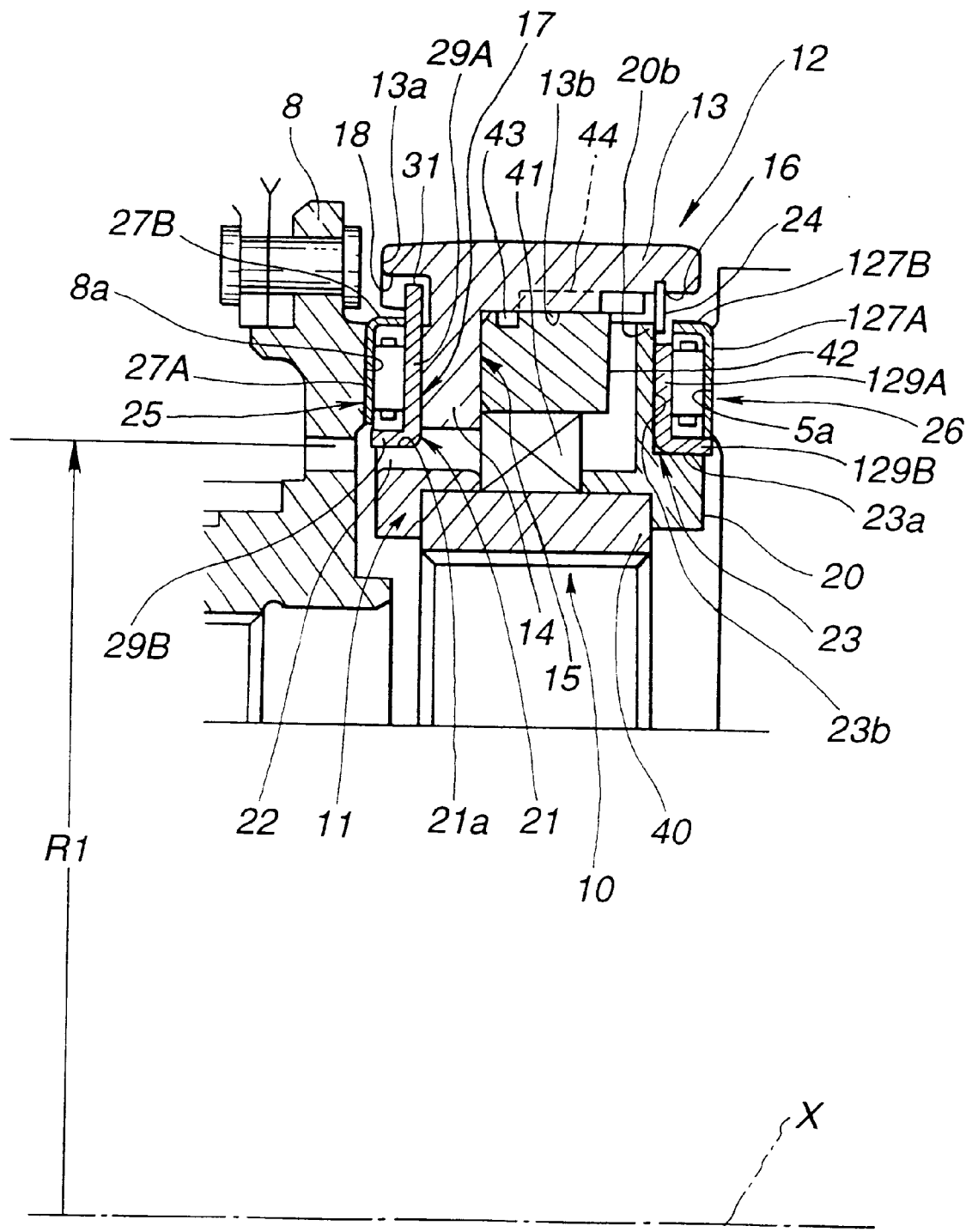
FIG. 2 is a fragmentary enlarged view of the torque converter of FIG. 1.
Figure 3:
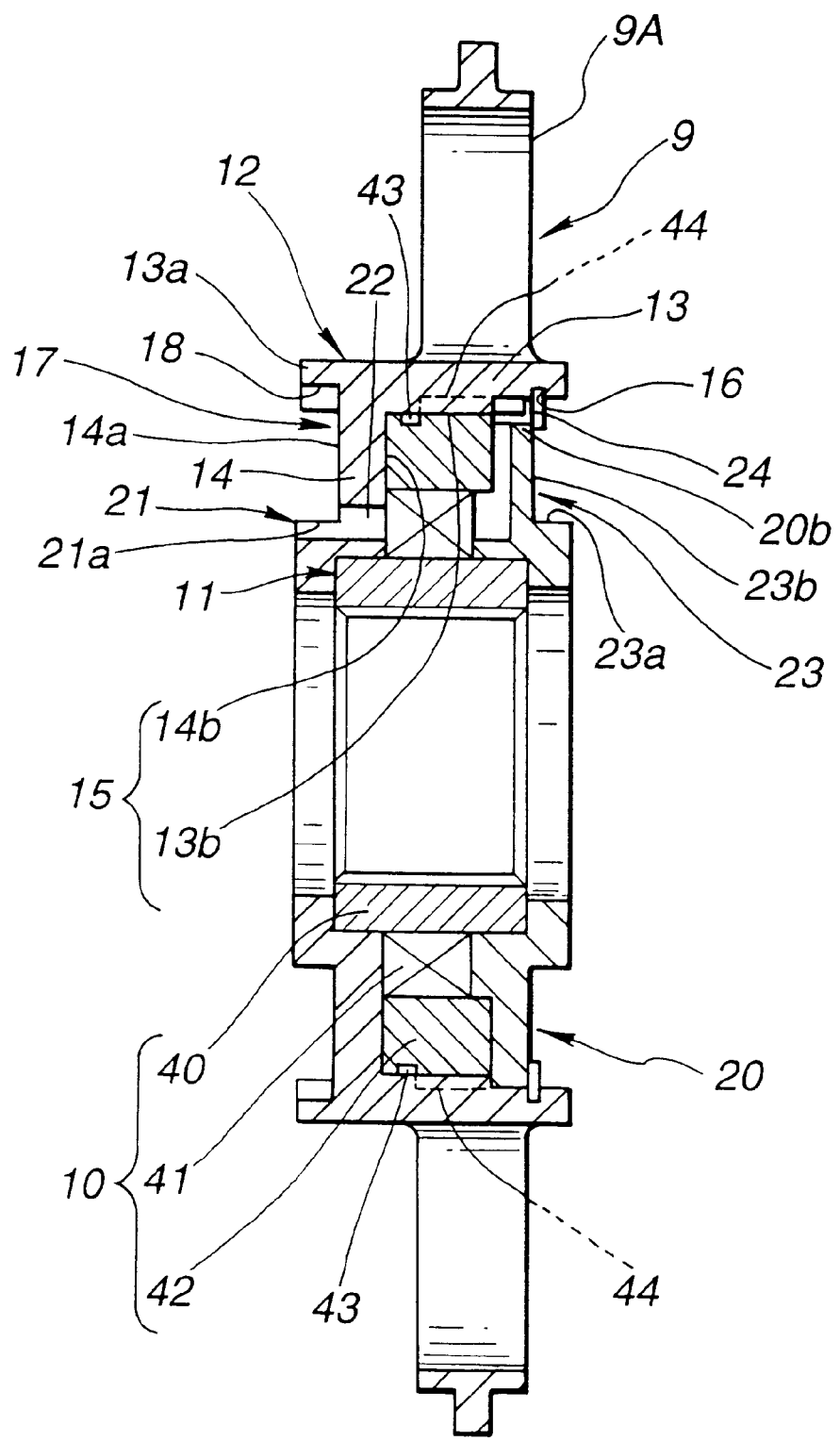
FIG. 3 is a partial axial section of the stator and the one-way clutch.

As illustrated in FIGS. 2 and 3, the stator hub 12 of the stator 9 has an inner clutch-receiving portion 11 and an outer clutch-receiving portion 15 that cooperate to receive the one-way clutch 10, and a thrust bearing-receiving recessed portion 17 receiving the thrust bearing 25.

Specifically, as best shown in FIG. 3, the stator hub 12 includes a cylindrical base wall 13 having an axial cylindrical bore, and an end wall 14 connected with one axial end portion of the base wall 13. The end wall 14 radially extends from an inner circumferential surface 13b of the base wall 13. The end wall 14 is disposed axially adjacent to the axial cylindrical bore of the base wall 13.

The thrust bearing-receiving recessed portion 17 is formed in the end wall 14. The thrust bearing-receiving recessed portion 17 is formed of a generally annular shape and recessed from one axial end face of the end wall 14 that is opposed to the opposite axial end face 14b exposed to the axial cylindrical bore. The thrust bearing-receiving recessed portion 17 includes a bearing mount 21 located on an inner periphery thereof, onto which the thrust bearing 25 is mounted as best shown in FIG. 2. The bearing mount 21 has a support surface 21a supporting a generally ring-shaped bearing race 29 of the thrust bearing 25 as described later. The support surface 21a is an inner circumferential surface of the thrust bearing-receiving recessed portion 17 that extends axially and circumferentially. A plurality of oil grooves 22 are arranged on the support surface 21a to be circumferentially spaced from each other at a predetermined distance. The thrust bearing-receiving recessed portion 17 also includes a ring-shaped radially extending bottom 14a facing the bearing race 29, and an outer periphery that is connected with the bottom 14a and opposed to the support surface 21a. A plurality of grooves 18 are disposed on the outer periphery of the thrust bearing-receiving recessed portion 17. Specifically, the grooves 18 are arranged on an outer circumferential surface of the thrust bearing-receiving recessed portion 17 in such a manner as to be circumferentially spaced from each other at a predetermined distance. The grooves 18 extend radially from the outer circumferential surface of the thrust bearing-receiving recessed portion 17.

Figure 4A:
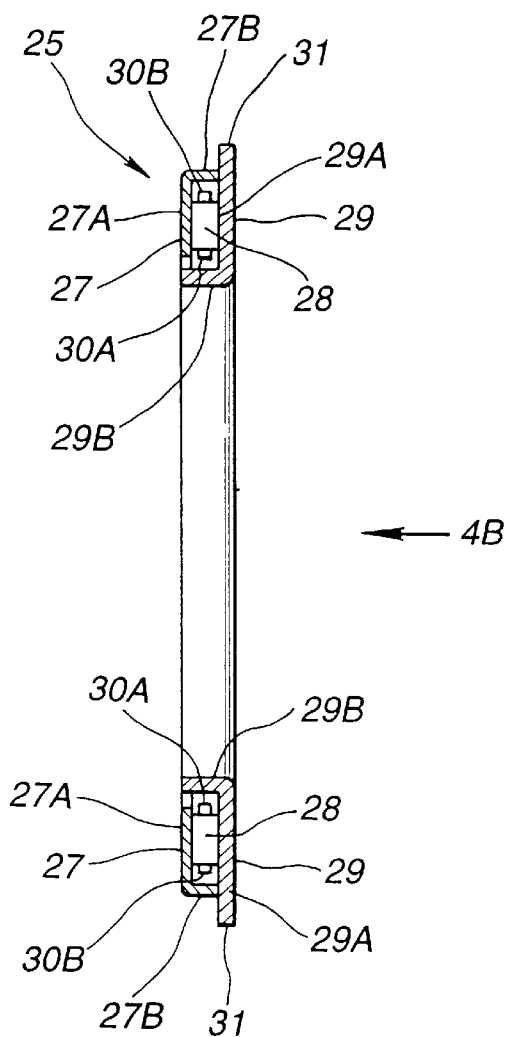
FIG. 4A is an axial section of the thrust bearing.
Figure 4B:
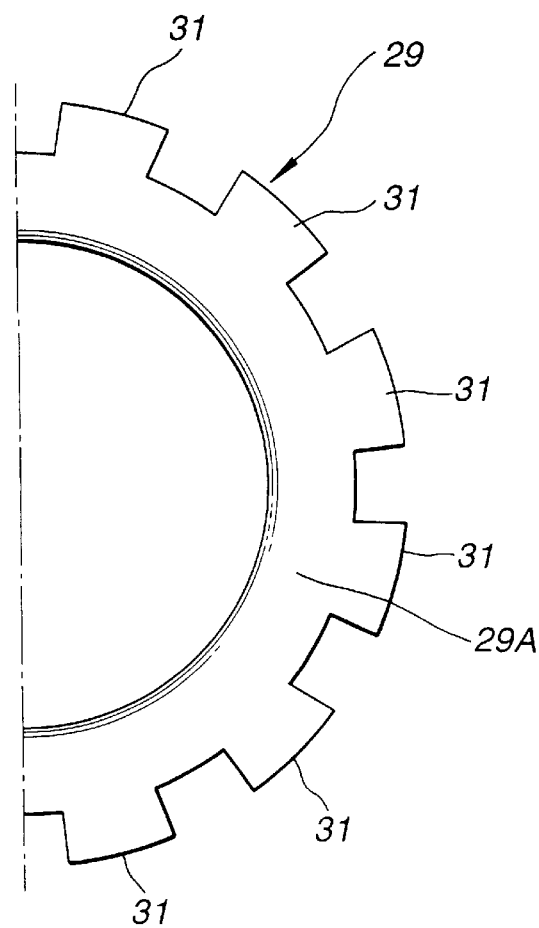
FIG. 4B is a partial plan view of the thrust bearing as viewed from a direction indicated by arrow 4B in FIG. 4A.

Referring to FIGS. 4A and 4B, the thrust bearing 25 will be explained hereinafter.

As illustrated in FIG. 4A, the thrust bearing 25 includes a pair of bearing races 27 and 29, a plurality of rollers 28 and inner and outer retainers 30A and 30B. The bearing race 27 is disposed on the turbine side and the opposite bearing race 29 is disposed on the stator side, as shown in FIG. 1. The stator-side bearing race 29 has a greater thickness than the turbine-side bearing race 27. The bearing race 29 has a ring-shaped body portion 29A and a retaining portion 29B extending perpendicular to the body portion 29A. The retaining portion 29B is connected with an inner circumference of the body portion 29A and integrally formed with the body portion 29A.

Similarly, the opposite bearing race 27 has a ring-shaped body portion 27A and a retaining portion 27B extending perpendicular to the body portion 27A. The retaining portion 27B is connected with an outer circumference of the body portion 27A. The rollers 28 are interposed between the opposed bearing races 27 and 29. The inner retainer 30A is disposed between the retaining portion 29B of the bearing race 29 and inner ends of the rollers 28. The outer retainer 30B is disposed between the retaining portion 27B of the bearing race 27 and outer ends of the rollers 28.

Referring back to FIG. 2, the thrust bearing 25 constructed as one unit is mounted to the stator hub 12. As illustrated in FIG. 2, the thrust bearing 25 is received in the thrust bearing-receiving recessed portion 17 of the stator hub 12. The stator-side bearing race 29 is received by the recessed portion 17. The body portion 27A of the turbine-side bearing race 27 is contacted with a radially extending support surface 8a formed on the turbine hub 8. The body portion 29A of the bearing race 29 faces the bottom 14a, shown in FIG. 3, of the recessed portion 17. The retaining portion 29B of the bearing race 29 is supported by the bearing mount 21 of the recessed portion 17. The retaining portion 29B is contacted with the support surface 21a of the bearing mount 21 and supported thereon. With the arrangement of the support surface 21a of the bearing mount 21, the thrust bearing 25 is centered on the stator hub 12. This can omit the centering of the thrust bearing 25 being taken on the turbine hub side, eliminating the additional working of the turbine hub 8 required for the centering of the thrust bearing 25 on the turbine hub side. This serves for readily forming the turbine hub 8 having a simple configuration.

The stator-side bearing race 29 of the thrust bearing 25 is connected with the stator hub 12 of the stator 9 by a coupling. The coupling includes a first engaging part disposed on the outer periphery of the bearing race 29 and a second engaging part that is engaged with the first engaging part and disposed on the outer periphery of the thrust bearing-receiving recessed portion 17 in opposed relation to the outer periphery of the bearing race 29. In this embodiment, the first engaging part includes a plurality of projections 31 radially extending from an outer circumference of the body portion 29A of the bearing race 29 as best shown in FIGS. 4A and 4B. The projections 31 are arranged so as to be circumferentially spaced from each other at a predetermined distance. The second engaging part of the coupling is in the form of the above-explained grooves 18 arranged on the outer circumferential surface of the thrust bearing-receiving recessed portion 17 as shown in FIG. 3. The grooves 18 are configured similarly to the projections 31 to be engageable therewith. The first and second engaging parts, i.e., the projections 31 and the grooves 18 in this embodiment, mutually engage, cooperating to prevent a relative rotation between the bearing race 29 and the stator 9. Thus, with the arrangement of the coupling, the bearing race 29 of the thrust bearing 25 can be prevented from rotating relative to the stator hub 12 of the stator 9. Therefore, the thrust bearing-receiving recessed portion 17 of the stator hub 12 can be avoided from suffering from abrasion caused by the rotation of the bearing race 29. This serves for extending the life of the torque converter.

As illustrated in FIG. 3, the inner clutch-receiving portion 11 of the stator hub 12 is formed at an inner peripheral corner portion of the end wall 14 at which the inner circumferential surface encounters the opposite axial end face 14b. The inner clutch-receiving portion 11 is in the form of an annular recess and located radially inwardly spaced from the thrust bearing-receiving recessed portion 17. Fit to the inner clutch-receiving portion 11 is an inner race 40 of the one-way clutch 10. The one-way clutch 10 also includes an outer race 42 radially spaced from the inner race 40 and a sprag 41 interposed between the inner and outer races 40 and 42. The outer race 42 and the sprag 41 are received in the outer clutch-receiving portion 15 of the stator hub 12. The outer clutch-receiving portion 15 is constituted by the inner circumferential surface 13b of the cylindrical base wall 13 of the stator hub 12 and the opposite axial end face 14b of the end wall 14. The opposite axial end face 14b is disposed perpendicular to the inner circumferential surface 13b, acting as a butting surface on which an axial end face of the outer race 42 abuts.

The one-way clutch 10 is mounted to the outer clutch-receiving portion 15 by press-fitting the outer race 42 into the axial cylindrical bore of the base wall 13 of the stator hub 12. An outer circumferential surface of the outer race 42 mates with the inner circumferential surface 13b of the base wall 13. The outer race 42 is made of a suitable material harder than the aluminum-based material of the stator 9, for instance, in this embodiment made of an iron-based material. A chip trapping groove 43 and serrations 44 adjacent to the chip trapping groove 43 are formed on the outer circumferential surface of the outer race 42. The chip trapping groove 43 traps chips that are generated by abrasion of the inner circumferential surface 13b of the base wall 13 when the outer race 42 with the serrations 44 is press-fit into the axial cylindrical bore of the base wall 13. With this arrangement, the chips trapped by the groove 43 can be prevented from flowing out thereof into the fluid flow even if the fitting engagement between the outer race 42 and the base wall 13 of the stator hub 12 is loosened due to a difference of thermal expansion between the iron-based and aluminum-based materials at a high temperature.

The retention plate 20 supporting the one-way clutch 10 is mounted to the other axial end portion of the base wall 13 of the stator hub 12 in an opposed relation to the end wall 14. The retention plate 20 has one axial end face engaged with the inner race 40 of the one-way clutch 10 to retain the sprag 41 and the outer race 42 thereof. The one axial end face of the retention plate 20 and the clutch-receiving portions 11 and 15 of the stator hub 12 cooperate to define a clutch chamber accommodating the one-way clutch 10. The retention plate 20 has the opposite axial end face formed with an annular recess to provide a bearing mount 23 for mounting the thrust bearing 26 as shown in FIG. 2. The bearing mount 23 includes an axially extending support surface 23a supporting a bearing race 129 of the thrust bearing 26, and a radially extending contact surface 23b perpendicular to the support surface 23a. The retention plate 20 is retained at the outer periphery 20b by a snap ring 24 in such a manner as to be prevented from being inclined rightward as viewed in FIG. 3, with respect to the axis of the stator 9. The snap ring 24 is engaged in a circumferential groove 16 that is formed on the inner circumferential surface 13b of the base wall 13.

As illustrated in FIG. 2, the thrust bearing 26 mounted to the bearing mount 23 has substantially the same structure as that of the thrust bearing 25 except the projections 31 formed on the bearing race 29 of the thrust bearing 25. The thrust bearing 26 includes one bearing race 127 disposed on the pump housing side, the opposite bearing race 129 disposed on the stator side, rollers 128 and inner and outer retainers 130A and 130B that are interposed between the bearing races 127 and 129. The pump housing-side bearing race 127 has a radially extending ring-shaped body portion 127A contacted with a support surface 5a formed inside the pump housing 5. The stator-side bearing race 129 has a radially extending ring-shaped body portion 129A and an axially extending retaining portion 129B perpendicular to the body portion 129A. The body portion 129A is contacted with the contact surface 23b of the bearing mount 23 of the retention plate 20. The retaining portion 129B is contacted with the support surface 23a of the bearing mount 23 of the retention plate 20 and supported thereon.

The support surface 21a of the bearing mount 21 of the thrust bearing-receiving recessed portion 17 of the stator hub 12 and the support surface 23a of the bearing mount 23 of the retention plate 20 are located at the same position distant from the central axis X of the torque converter 1 by radius R1 as shown in FIG. 2. The central axis X is identical with the rotation axis of the stator 9.

Figure 5:
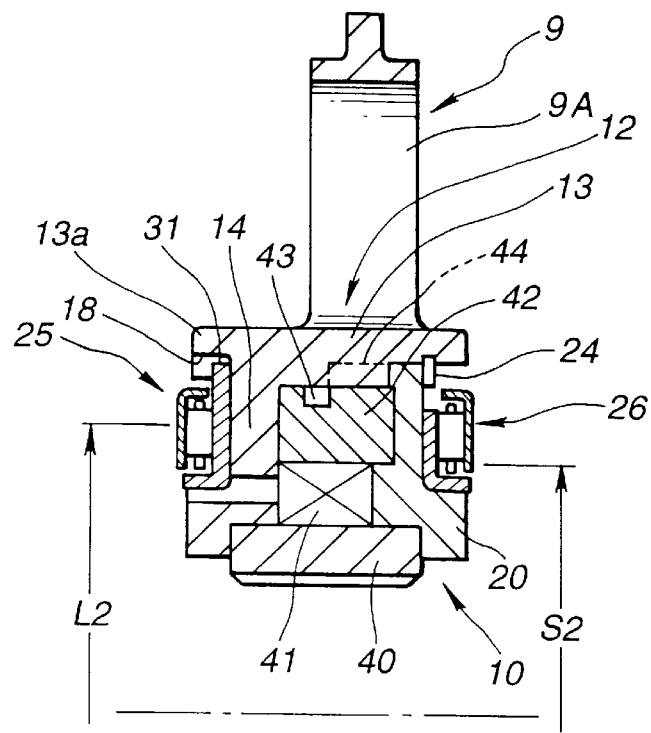
FIG. 5 is an explanatory diagram of positional relationship between the thrust bearing and the one-way clutch.

Referring now to FIG. 5, a positional relationship between the thrust bearing 25 and the outer race 42 of the one-way clutch 10 is explained. The rollers 28 of the thrust bearing 25 have a rolling diameter indicated at L2 in FIG. 5, that is greater than an inner diameter indicated at S2 in FIG. 5, of the outer race 42 of the one-way clutch 10. With this arrangement, when a thrust force is exerted on the thrust bearing 25, the rolling surface of the rollers 28 that is formed by the rollers 28 during their rotation, can be prevented from being inclined relative to the central axis X. This enables the life of the torque converter to be extended. Conversely, if the rolling diameter of the rollers 28 is smaller than the inner diameter of the outer race 42 of the one-way clutch 10, the rolling surface of the rollers 28 tends to be inclined relative to the central axis X upon application of the thrust force. This leads to the shortened life of the torque converter.

Figure 6:
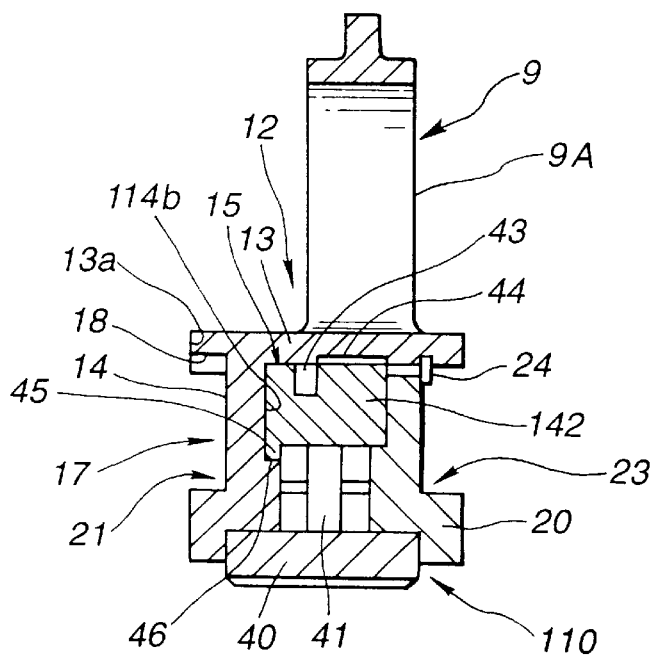
FIG. 6 is a partial axial section of a modified arrangement of the one-way clutch and the stator hub.

Referring to FIG. 6, a second embodiment of the torque converter according to the invention will be explained, which is substantially the same as the above-described first embodiment except a modified one-way clutch 110. Like reference numerals denote like parts and therefore detailed explanations therefor are omitted.

As illustrated in FIG. 6, the one-way clutch 110 includes an outer race 142 having a projection 45 that radially extends from an inner periphery of one axial end portion of the outer race 142. The projection 45 abuts against an axial end face of the sprag 41 to prevent the sprag 41 from being axially offset relative to the outer race 142. The projection 45 retains the sprag 41 at the axial central position relative to the outer race 142. This contributes to extension of the life of the one-way clutch 10.

The projection 45 is engaged with a recessed portion 46 of a butting surface 114b of the outer clutch-receiving portion 15 that is disposed on one axial end face of the end wall 14 of the stator hub 12. The projection 45 is fit into the recessed portion 46 owing to the difference of thermal expansion between the outer race 142 made of the iron-based material and the stator hub 12 made of the aluminum-based material. The fitting engagement of the projection 45 and the recessed portion 46 ensures the retention of the sprag 41 in place.

What is claimed is:

1. A torque converter comprising:
   a stator rotatable about an axis, said stator including a stator hub having an end wall extending radially inwardly at an axial end of said stator hub, said end wall being formed with a recessed portion recessed from one axial end face thereof;
   a thrust bearing including a pair of first and second bearing races opposed to each other and a plurality of rollers disposed between said first and second bearing races, said first bearing race being received by said recessed portion; and
   a coupling connecting said first bearing race with said stator hub;
   said coupling including a plurality of projections extending radially outwardly from an outer circumferential surface of said first bearing race and arranged in a circumferentially spaced relation to each other and a plurality of grooves that is engaged with said plurality of projections, said plurality of grooves extending radially inwardly from an outer circumferential surface of said recessed portion that is opposed to said outer circumferential surface of said first bearing race and being arranged in a circumferentially spaced relation to each other, said plurality of projections and said plurality of grooves cooperating to prevent a relative rotation between said first bearing race and said stator.

2. A torque converter as claimed in claim 1, further comprising a one-way clutch enabling said stator to rotate in one direction, said one-way clutch being disposed within a clutch-receiving portion formed in said stator hub, said one-way clutch including an outer race formed with serrations on an outer circumferential surface thereof, said outer race being in fitting engagement at the serrations with said clutch-receiving portion.

3. A torque converter as claimed in claim 2, wherein said outer race has a chip trapping groove disposed adjacent to said serrations, said chip trapping groove trapping chips abraded from said stator hub upon said outer race being press-fit into said clutch-receiving portion.

4. A torque converter as claimed in claim 3, wherein said outer race is made of a material harder than a material of which said stator hub is made.

5. A torque converter as claimed in claim 2, wherein said one-way clutch includes a sprag inside said outer race and said outer race has a radially extending projection on an axial end portion thereof, said projection abutting against said sprag to prevent said sprag from being axially offset relative to said outer race.

6. A torque converter as claimed in claim 2, wherein said end wall of said stator hub has an opposite axial end face partly defining said clutch-receiving portion, said outer race of said one-way clutch abutting on said opposite axial end face of said end wall.

7. A torque converter as claimed in claim 2, wherein said plurality of rollers have a rolling diameter greater than an inner diameter of said outer race of said one-way clutch.

8. A torque converter comprising:

a pump impeller;

a turbine opposed to said pump impeller;

a stator interposed between said pump impeller and said turbine, said stator being rotatable about an axis, said stator including a stator hub having an end wall extending radially inwardly at an axial end of said stator hub, said end wall being formed with a recessed portion recessed from one axial end face thereof;

a thrust bearing disposed between said stator and said turbine, said thrust bearing including a first bearing race received by said recessed portion and a second bearing race opposed to said first bearing race and in contact with said turbine; and a coupling mutually engaging and cooperating to lock said first bearing race on said stator, said coupling including a plurality of projections extending radially outwardly from an outer circumferential surface of said first bearing race and arranged in a circumferentially spaced relation to each other and a plurality of grooves engaged with said plurality of projections, said plurality of grooves extending radially from an outer circumferential surface of said recessed portion that is opposed to said outer circumferential surface of said first bearing race and being arranged in a circumferentially spaced relation to each other.

9. A torque converter as claimed in claim 8, further comprising a second thrust bearing disposed between said stator and said pump impeller, said second thrust bearing being similar to and substantially aligned with said first thrust bearing along a line parallel to an axis of rotation of said torque converter, said second thrust bearing including a third bearing race arranged at an opposite axial end of said stator hub and a fourth bearing race opposed to said third bearing race and in contact with said pump impeller.

10. A torque converter as claimed in claim 9, further comprising a one-way clutch enabling said stator to rotate in one direction, said one-way clutch being disposed within a clutch-receiving portion formed in said stator hub, said one-way clutch including an outer race formed with serrations on an outer circumferential surface thereof, said outer race being in fitting engagement at the serrations with said clutch-receiving portion.

11. A torque converter as claimed in claim 10, wherein said outer race has a chip trapping groove disposed adjacent to said serrations, said chip trapping groove trapping chips abraded from said stator hub upon said outer race being press-fit into said clutch-receiving portion.

12. A torque converter as claimed in claim 11, wherein said thrust bearing includes a plurality of rollers disposed between said first and second bearing races, said plurality of rollers having a rolling diameter greater than an inner diameter of said outer race of said one-way clutch.

13. A torque converter as claimed in claim 11, wherein said outer race is made of a material harder than a material of which said stator hub is made.

14. A torque converter as claimed in claim 10, wherein said one-way clutch includes a sprag inside said outer race and said outer race has a radially extending projection on an axial end portion thereof, said projection abutting against said sprag to prevent said sprag from being axially offset relative to said outer race.

15. A torque converter as claimed in claim 10, wherein said end wall of said stator hub has an opposite axial end face partly defining said clutch-receiving portion, said outer race of said one-way clutch abutting on said opposite axial end face of said end wall.

* * * * *